(12) United States Patent
Kanamura et al.

(10) Patent No.: US 8,309,258 B2
(45) Date of Patent: Nov. 13, 2012

(54) METHOD FOR FILLING WITH ELECTRODE ACTIVE MATERIAL AND METHOD FOR PRODUCING ALL-SOLID-STATE CELL

(75) Inventors: Kiyoshi Kanamura, Hachioji (JP); Masanori Hara, Hachioji (JP); Atsushi Kaeriyama, Hachioji (JP); Yosuke Sato, Gifu-pref. (JP); Toshihiro Yoshida, Nagoya (JP)

(73) Assignees: Tokyo Metropolitan University, Shinjuku-Ku (JP); NGK Insulators, Ltd., Nagoya (JP)

( * ) Notice: Subject to any disclaimer, the term of this patent is extended or adjusted under 35 U.S.C. 154(b) by 900 days.

(21) Appl. No.: 12/399,219

(22) Filed: Mar. 6, 2009

(65) Prior Publication Data

US 2009/0229700 A1    Sep. 17, 2009

(30) Foreign Application Priority Data

Mar. 7, 2008 (JP) ................................ 2008-057754
Feb. 17, 2009 (JP) ................................ 2009-034382
Feb. 27, 2009 (JP) ................................ 2009-046916

(51) Int. Cl.
*H01M 6/18* (2006.01)
*H01M 10/0562* (2010.01)

(52) U.S. Cl. .................. 429/322; 429/304; 429/321

(58) Field of Classification Search .............. 429/304, 429/321, 322, 482, 483, 491; *H01M 6/18, H01M 10/0562*
See application file for complete search history.

(56) References Cited

U.S. PATENT DOCUMENTS

| | | | |
|---|---|---|---|
| 4,439,502 A | 3/1984 | Bittihn et al. | |
| 4,985,317 A | 1/1991 | Adachi et al. | |
| 2003/0099884 A1 | 5/2003 | Chiang et al. | |
| 2007/0154762 A1 | 7/2007 | Schucker | |

FOREIGN PATENT DOCUMENTS

| | | |
|---|---|---|
| EP | 1926164 | 5/2008 |
| JP | 2000-311710 A1 | 11/2000 |
| JP | 2005-063958 A1 | 3/2005 |
| JP | 2006-260887 A1 | 9/2006 |
| WO | 2008/059987 A1 | 5/2008 |

OTHER PUBLICATIONS

"Three-dimensionally ordered composite electrode between LiMn2O4 and Li1.5Al0.5Ti1.5 (PO4)3" by Nakano et al. published in Ionics (2008) 14: 173-177.*

"Fabrication of all solid-state lithium-ion batteries with three-dimensionally ordered composite electrode consisting of Li0.35La0.55TiO3 and LiMn2O4" by Hara et al. published in Journal of Power Sources 189 (2009) 485-489.*

U.S. Appl. No. 12/399,209, filed Mar. 6, 2009, Kanamura et al.

U.S. Office Action from Co-Pending U.S. Appl. No. 12/399,209, dated Apr. 19, 2012 (9 pages).

* cited by examiner

*Primary Examiner* — Jennifer Michener
*Assistant Examiner* — Heng Chan
(74) *Attorney, Agent, or Firm* — Burr & Brown

(57) ABSTRACT

A solid electrolyte structure containing a porous solid electrolyte is prepared. At least the porous solid electrolyte of the solid electrolyte structure is immersed in a first sol solution containing at least a precursor of an electrode active material as a solute. Then, the first sol solution, in which the porous solid electrolyte is immersed, is heated. A solvent of the first sol solution is evaporated by the heating, whereby a pore of the porous solid electrolyte is filled with a high concentration (a large amount) of the electrode active material precursor.

13 Claims, 14 Drawing Sheets

METHOD FOR FILLING WITH ELECTRODE ACTIVE MATERIAL AND METHOD FOR PRODUCING ALL-SOLID-STATE CELL

CROSS-REFERENCE TO RELATED APPLICATIONS

This application is based upon and claims the benefit of priority from Japanese Patent Application No. 2008-057754 filed on Mar. 7, 2008, Japanese Patent Application No. 2009-034382 filed on Feb. 17, 2009 and Japanese Patent Application No. 2009-046916 filed on Feb. 27, 2009 in the Japanese Patent Office, of which the contents are incorporated herein by reference.

1. Field Of The Invention

The present invention relates to a method for filling a pore of a porous solid electrolyte usable as a component of an all-solid-state cell with an electrode active material, and a method for producing an all-solid-state cell.

2. Description of the Related Art

BACKGROUND OF THE INVENTION

In recent years, with the development of portable devices such as personal computers and mobile phones, there has been rapidly increasing demand for batteries usable as a power source thereof. In cells of the batteries for the purposes, a liquid electrolyte (an electrolytic solution) containing a combustible organic diluent solvent has been used as an ion transfer medium.

The cell using such an electrolytic solution may cause problems of solution leakage, explosion, etc.

In view of solving the problems, all-solid-state cells, which use a solid electrolyte instead of the liquid electrolyte and contain only solid components to ensure intrinsic safety, have been developing. The all-solid-state cell contains a sintered ceramic as the solid electrolyte, and thereby does not cause the problems of ignition and liquid leakage, and is hardly deteriorated in battery performance by corrosion. Particularly all-solid-state secondary lithium cells can achieve a high energy density easily, and thus have been actively studied in various fields (see, for example, Japanese Laid-Open Patent Publication Nos. 2000-311710 and 2005-063958).

As described above, the all-solid-state cell is excellent in safety and so on. However, since the all-solid-state cell contains only the solid components including the solid electrolyte, it faces major problems in terms of increasing the ion conductivity of the solid electrolyte, reducing the connection resistance between electrolyte particles (the particle boundary resistance), reducing the charge transfer resistance at the connection interface between the electrolyte and an electrode, etc.

For example, in a conventional liquid-type secondary lithium ion cell using the liquid electrolyte, the electrolyte penetrates between particles of a solid electrode, and thus the connection area between the electrolyte and the solid electrode corresponds not to the plane surface area but to the specific surface area of the solid electrode. Further, when the electrolyte sufficiently penetrates in the solid electrode, the connection between the electrolyte and the solid electrode can be maintained in the desired state.

In contrast, the all-solid-state cell is generally produced by applying an electrode material (such as an active material precursor) to a plane surface of the solid electrolyte and by firing the resultant to form an electrode. In this production, the connection area between the solid electrolyte and the electrode does not exceed the plane area of the electrode. Practically, the connection area is the total of contact areas between particles of the solid electrolyte and the electrode, and thereby is generally smaller than the surface area of the electrode.

For increasing the contact area between the solid electrolyte and the electrode active material, and thereby lowering the charge transfer resistance therebetween, for example, an all-solid-state secondary lithium cell having a composite electrode formed by filling pores of a porous solid electrolyte with an electrode active material is disclosed in Japanese Laid-Open Patent Publication No. 2006-260887, etc.

However, no specific process for filling the pores of the porous solid electrolyte with the electrode active material is described at all in Japanese Laid-Open Patent Publication No. 2006-260887. There has been no known suitable method for filling the pores with a larger amount of the electrode active material.

SUMMARY OF THE INVENTION

In view of the above problems, an object of the present invention is to provide a method capable of efficiently filling a pore of a porous solid electrolyte with a large amount of an electrode active material by only one treatment.

Another object of the present invention is to provide a method capable of efficiently filling a pore of a porous solid electrolyte with a large amount of an electrode active material, thereby producing an all-solid-state cell having a low charge transfer resistance between the solid electrolyte and the electrode active material.

According to a first aspect of the present invention, there is provided a method for filling a pore of a porous solid electrolyte with an electrode active material, comprising an immersion step of immersing the porous solid electrolyte in a precursor solution containing at least a precursor of the electrode active material as a solute, and a heating step of heating the precursor solution in which the porous solid electrolyte is immersed.

In the first aspect, the method may further comprise a thermal treatment step of, after the heating step, subjecting the precursor of the electrode active material filling the pore of the porous solid electrolyte to a thermal treatment, thereby converting the precursor to the electrode active material.

In the first aspect, the method may further comprise a pretreatment step of, before the immersion step, immersing the porous solid electrolyte in a pretreatment solution containing at least a surfactant as a solute. It is preferred that the pretreatment solution and the precursor solution contain the same solvent.

In the first aspect, in the immersion step, after being vacuum-deaerated, the porous solid electrolyte is immersed in the precursor solution.

In the first aspect, the porous solid electrolyte may comprise an oxide or a phosphate compound.

In the first aspect, the porous solid electrolyte is not particularly limited, and may comprise an LLT ($Li_{3x}La_{2/3-x}TiO_3$, $0 \leq x \leq 2/3$), an LAMP ($Li_{1+x}Al_xM_{2-x}(PO_4)_3$, $0 \leq x \leq 1$, M is a tetravalent transition metal such as Ge, Ti or Zr), or an aluminum (Al)-containing ceramic material having a garnet-type or garnet-like-type crystal structure containing lithium (Li), lanthanum (La), zirconium (Zr), and oxygen (O).

In the first aspect, the electrode active material may comprise an oxide or a phosphate compound.

In the first aspect, the electrode active material is not particularly limited, and may comprise a lithium-manganese composite oxide, a lithium-cobalt composite oxide, or an LVP ($Li_mV_2(PO_4)_3$, $1 \leq m \leq 5$). The lithium-manganese composite oxide may be a lithium manganate containing Li and Mn as main components (such as $LiMn_2O_4$) having a cubic spinel structure, etc., and the lithium-cobalt composite oxide may be $LiCoO_2$, etc.

According to a second aspect of the present invention, there is provided a method for filling a pore of a porous solid electrolyte with an electrode active material, comprising an immersion step of immersing the porous solid electrolyte in an electrode active material solution containing at least a fine particle of the electrode active material as a solute, and a heating step of heating the electrode active material solution in which the porous solid electrolyte is immersed.

According to a third aspect of the present invention, there is provided a method for producing an all-solid-state cell, comprising at least an electrode active material filling process of filling a pore of a porous solid electrolyte with an electrode active material, wherein the electrode active material filling process comprises an immersion step of immersing the porous solid electrolyte in a precursor solution containing at least a precursor of the electrode active material as a solute, and a heating step of heating the precursor solution in which the porous solid electrolyte is immersed.

In the third aspect, the method preferably comprises a thermal treatment step of, after the heating step, subjecting the precursor of the electrode active material filling the pore of the porous solid electrolyte to a thermal treatment, thereby converting the precursor to the electrode active material.

According to a fourth aspect of the present invention, there is provided a method for producing an all-solid-state cell, comprising at least an electrode active material filling process of filling a pore of a porous solid electrolyte with an electrode active material, wherein the electrode active material filling process comprises an immersion step of immersing the porous solid electrolyte in an electrode active material solution containing at least a fine particle of the electrode active material as a solute, and a heating step of heating the electrode active material solution in which the porous solid electrolyte is immersed.

As described above, by using the electrode active material filling method of the present invention, the pore of the porous solid electrolyte can be efficiently filled with a large amount of the electrode active material by only one treatment.

Furthermore, by using the all-solid-state cell producing method of the present invention, the pore of the porous solid electrolyte can be filled with a large amount of the electrode active material, whereby the all-solid-state cell can be efficiently produced with a low charge transfer resistance between the solid electrolyte and the electrode active material.

The above and other objects, features and advantages of the present invention will become more apparent from the following description when taken in conjunction with the accompanying drawings in which a preferred embodiment of the present invention is shown by way of illustrative example.

DETAILED DESCRIPTION OF THE INVENTION

An embodiment of the electrode active material filling method and the all-solid-state cell producing method of the present invention will be described below with reference to FIGS. 1 to 14.

A method for filling a pore of a porous solid electrolyte with a precursor of an electrode active material (an electrode active material precursor) is proposed in International Publication No. WO 2008/059987.

In the proposed method, a sol of the electrode active material precursor is dropped on a porous layer surface of the porous solid electrolyte, or alternatively the porous layer is dipped in the sol. Specifically, the method may contain the steps of dropping the sol of the electrode active material precursor and then vacuum-impregnating the pore of the porous layer with the electrode active material precursor. Alternatively, the method may contain dropping the electrode active material precursor in vacuum to impregnate the pore with the electrode active material precursor.

However, it is difficult to efficiently fill the pore of the porous solid electrolyte with a large amount of the electrode active material by the proposed method. The solution of the electrode active material precursor has a low electrode active material precursor concentration. Therefore, even when the pore can be completely filled with the solution by one treatment, only a small amount of the electrode active material precursor remains in the pore practically.

Furthermore, when the solution of the electrode active material precursor is dried, a solid content is precipitated. In the step of vacuum-impregnating the porous layer of the porous solid electrolyte with the precursor solution dropped on the porous layer surface, a solvent in the solution is readily volatilized, and a part of the electrolyte is deposited on the porous layer surface to cause clogging of the pores. Thus, even in the case of repeatedly carrying out the steps of dropping the solution into the pores and vacuum-impregnating the pores with the solution, the solution cannot be appropriately introduced to the pores, and is dried and precipitated on the porous layer surface. Therefore, it is difficult to efficiently fill the pores of the porous solid electrolyte with a large amount of the electrode active material precursor by the proposed method.

The inventors have found the following methods capable of filling pores of a porous solid electrolyte with a larger amount of an electrode active material.

An electrode active material filling method according to a first embodiment of the present invention will be described below with reference to FIGS. 1 to 4.

Figure 1:
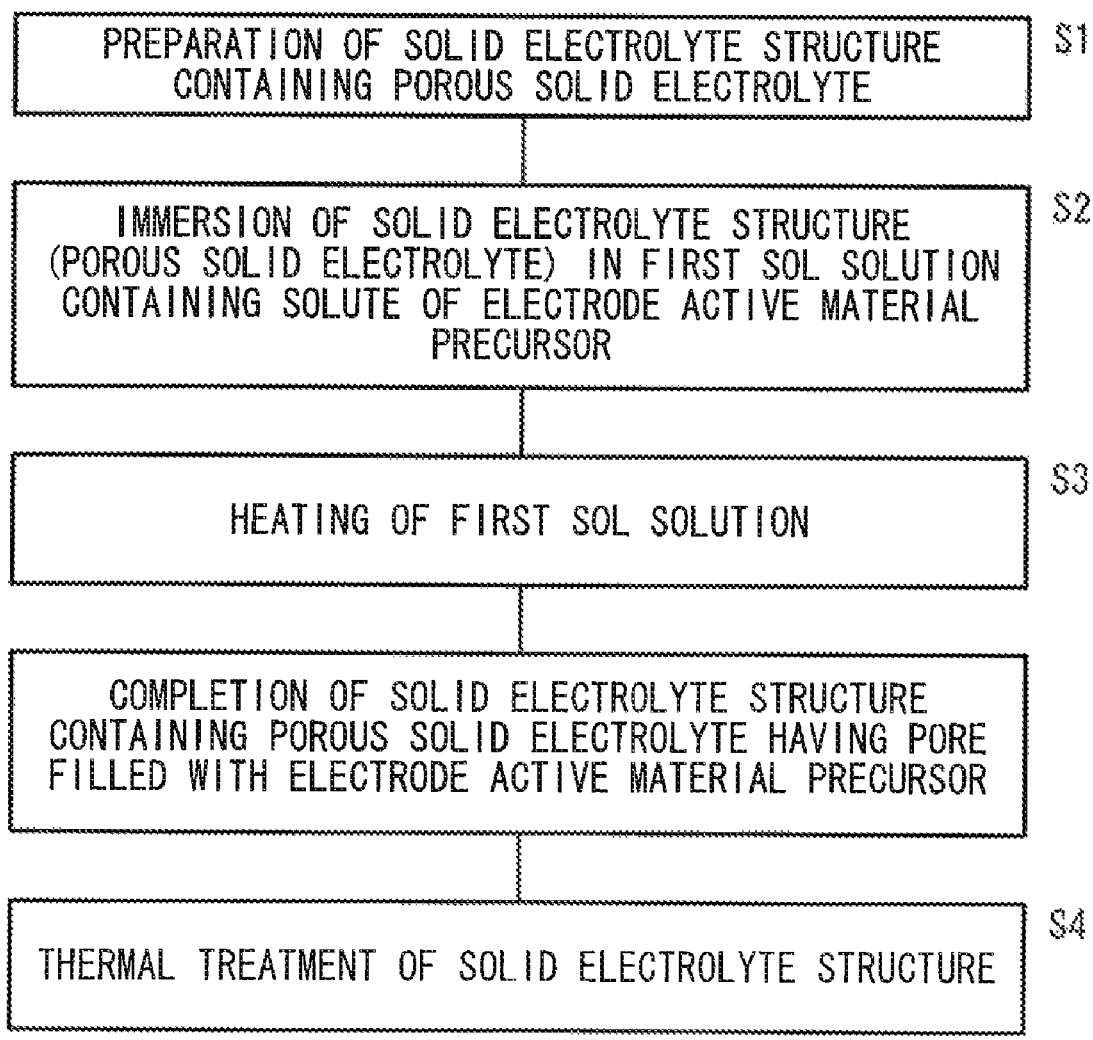
FIG. 1 is a process block diagram of an electrode active material filling method according to an embodiment of the present invention.

First, in the step S1 of FIG. 1, a solid electrolyte structure containing a porous solid electrolyte is prepared. The solid electrolyte structure containing the porous solid electrolyte may be produced by various methods, for example by screen printing of a paste containing a solid electrolyte crystal powder or by a colloidal crystal template method using polystyrene particles in the porous solid electrolyte. Among the various methods, one typical method is described below without intention of restricting the scope of the present invention.

Figure 2:
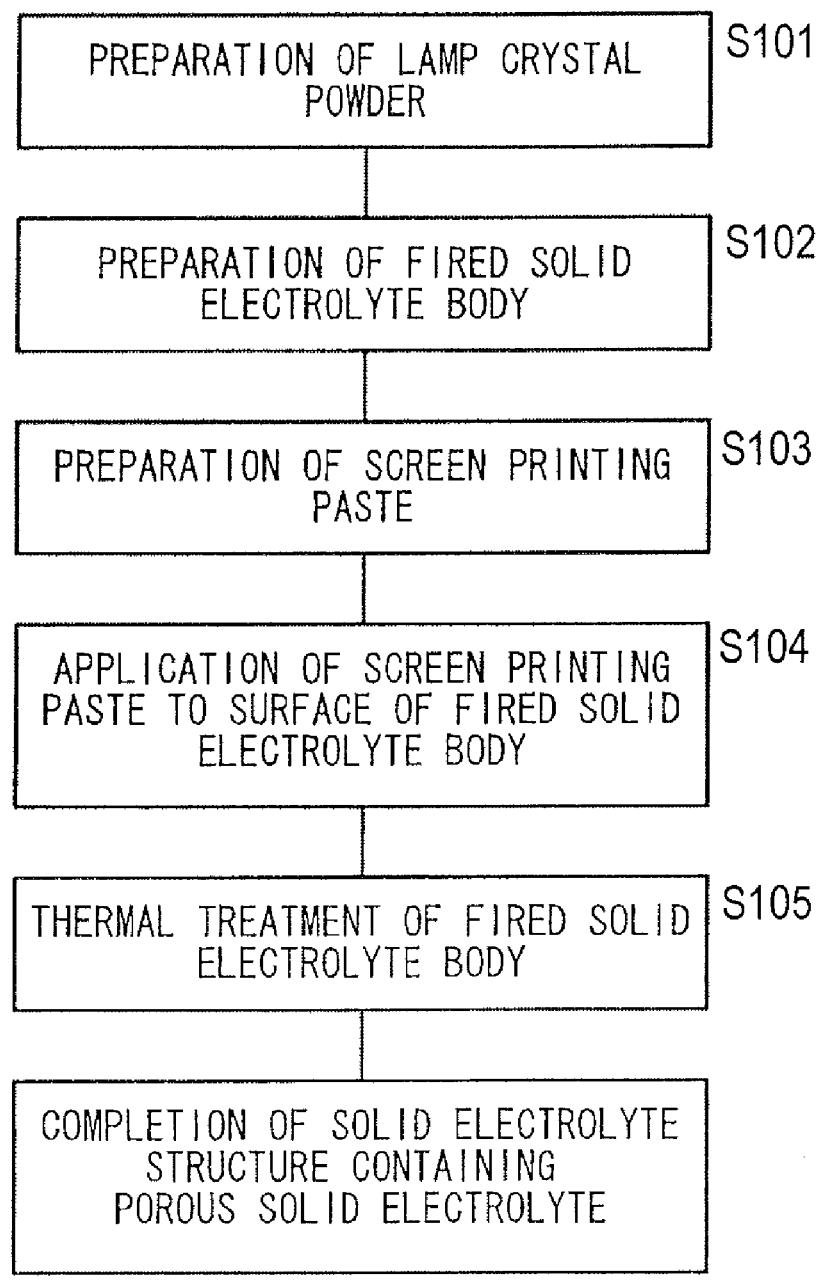
FIG. 2 is a process block diagram of a method of preparing a solid electrolyte structure containing a porous solid electrolyte.

In the step S101 of FIG. 2, a crystal powder of an LAMP ($Li_{1+x}Al_xM_{2-x}(PO_4)_3$, $0 \leq x \leq 1$, M is a tetravalent transition metal such as Ge, Ti or Zr) or the like is prepared.

In the step S102 of FIG. 2, the LAMP crystal powder is formed by press molding into a pressed powder pellet, and the pressed powder pellet is fired to obtain a fired LAMP solid electrolyte body.

In the step S103 of FIG. 2, a paste for screen printing is prepared using the LAMP crystal powder. The screen printing paste is prepared by adding a binder, an organic solvent, a pore forming agent, etc. to the LAMP crystal powder depending on a desired pore to be formed in a porous layer.

In the step S104 of FIG. 2, the obtained screen printing paste is applied by screen printing to a surface of the fired solid electrolyte body.

In the step S105 of FIG. 2, the fired solid electrolyte body, to which the screen printing paste is applied, is subjected to a thermal treatment, to obtain the solid electrolyte structure. In this case, in the solid electrolyte structure, a portion corresponding to the fired solid electrolyte body is a dense solid electrolyte, and a portion corresponding to the paste is a porous layer (i.e., the porous solid electrolyte).

The material for the solid electrolyte is not particularly limited. Though the material comprises the LAMP in the above example, the material may comprise an LLT ($Li_{3x}La_{2/3-x}TiO_3$, $0 \leq x \leq 2/3$) or an aluminum (Al)-containing ceramic material having a garnet-type or garnet-like-type crystal structure containing lithium (Li), lanthanum (La), zirconium (Zr), and oxygen (O).

Then, in the step S2 of FIG. 1, at least the porous solid electrolyte of the solid electrolyte structure is immersed in a sol solution containing at least a precursor of an electrode active material as a solute (hereinafter referred to as the first sol solution). The electrode active material is not particularly limited, and may comprise an LVP ($Li_mV_2(PO_4)_3$, $1 \leq m \leq 5$), etc. Specifically, the first sol solution is placed in a vessel such as a beaker, and at least the porous solid electrolyte of the solid electrolyte structure is immersed therein.

In the step S3 of FIG. 1, the first sol solution, in which the porous solid electrolyte is immersed, is heated. For example, the first sol solution is heated in air at 60° C. to 200° C. for 12 to 24 hours. By the heating treatment, a solvent in the first sol solution is volatilized to increase the concentration of the electrode active material precursor. Because the chemical potential is maintained uniform in the entire first sol solution, the electrode active material precursor concentration is made uniform in the first sol solution. Because the solution is convected due to the evaporation of the solvent, the electrode active material precursor concentration is made further uniform in the first sol solution. Thus, when the electrode active material precursor concentration is increased due to the volatilization of the solvent, the concentration is increased even in a pore of the porous solid electrolyte. Therefore, in the case of evaporating the solvent in the first sol solution, the pore of the porous solid electrolyte can be efficiently filled with a high concentration (a large amount) of the electrode active material precursor by only one treatment (one cycle of the immersion and the heating).

When the heating in the step S3 is completed, the solid electrolyte structure is taken out, and the surface of the structure is wiped to remove the excess sol. Thus, the solid electrolyte structure, which contains the porous solid electrolyte having the pore filled with the electrode active material precursor at a high concentration, is obtained.

Two modification examples will be described below with reference to FIGS. 3 and 4.

Figure 3:
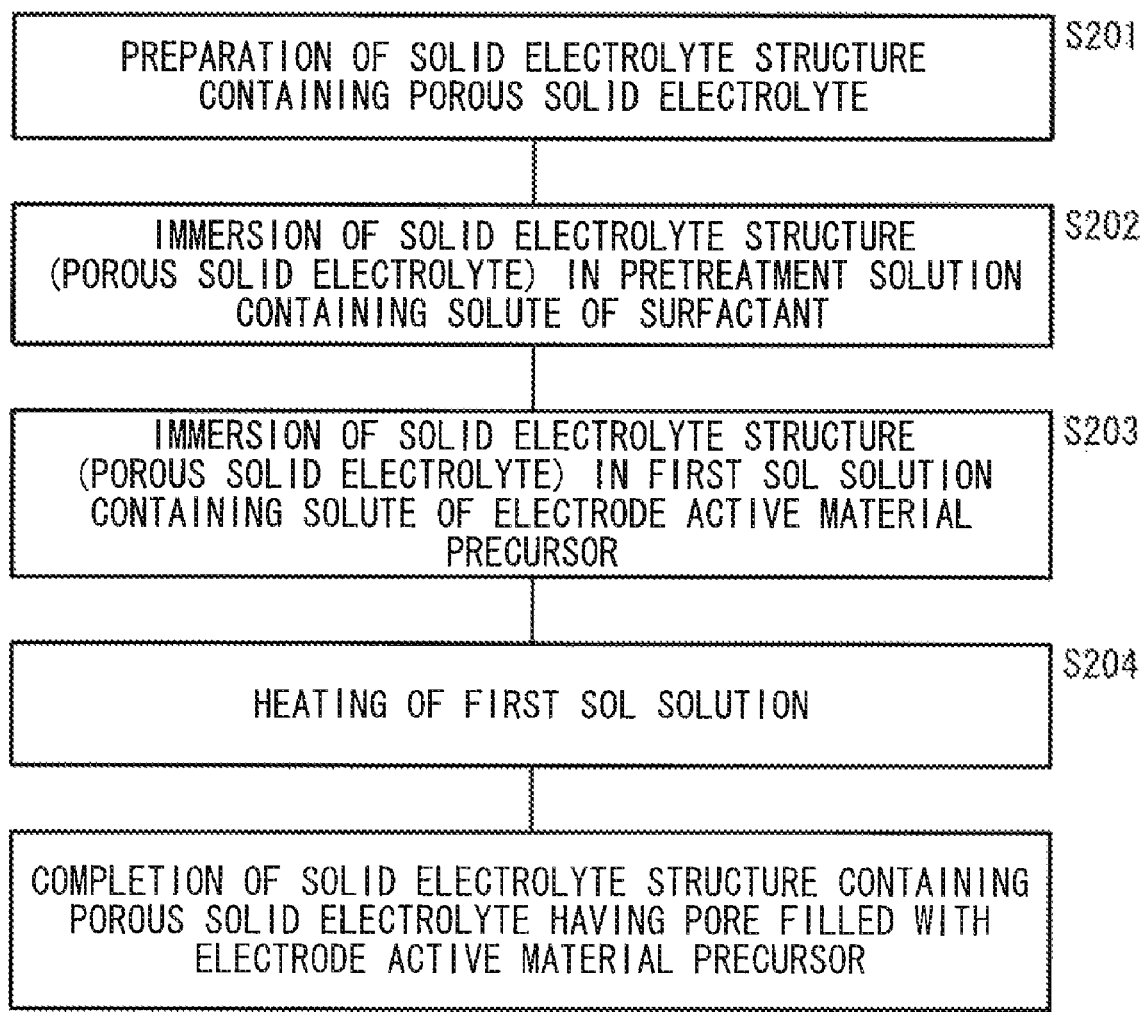
FIG. 3 is a process block diagram of a first modification example.

In an electrode active material filling method according to a first modification example, first, in the step S201 of FIG. 3, a solid electrolyte structure containing a porous solid electrolyte is prepared. Then, in the step S202 of FIG. 3, at least the porous solid electrolyte of the solid electrolyte structure is immersed in a pretreatment solution containing at least a surfactant as a solute, to carry out a pretreatment. For example, the porous solid electrolyte may be immersed for 1 to 4 hours.

After the solid electrolyte structure is separated from the pretreatment solution, the steps S203 and S204 of FIG. 3 are carried out in the same manner as the steps S2 and S3 of FIG. 1. At least the porous solid electrolyte of the solid electrolyte structure is immersed in the first sol solution in the step S203, and the first sol solution with the porous solid electrolyte immersed therein is heated in the step S204. After the heating treatment, the solid electrolyte structure is taken out, and the surface of the structure is wiped to remove the excess sol. Thus, the solid electrolyte structure, which contains the porous solid electrolyte having a pore filled with the electrode active material precursor at a high concentration, is obtained.

In the first modification example, by carrying out the pretreatment in the step S202, the first sol solution can be uniformly distributed in the entire pore of the porous solid electrolyte. In a case where the first sol solution contains a solvent having a high surface tension such as water, the first sol solution cannot be easily introduced into the pore of the porous solid electrolyte. Because the pretreatment solution containing at least the surfactant has a low surface tension, the pretreatment solution can be easily introduced into the pore of the porous solid electrolyte in the step of immersing the porous solid electrolyte in the pretreatment solution. Since the pretreatment solution is introduced into the pore of the porous solid electrolyte beforehand, the electrode active material precursor can be easily dispersed in the pore in the step of immersing the porous solid electrolyte, which has been taken out of the pretreatment solution, in the first sol solution. Thus, by carrying out the pretreatment, the electrode active material precursor can be easily introduced into the pore of the porous solid electrolyte even in the case where the first sol solution contains a solvent having a high surface tension such as water.

When the pretreatment solution and the first sol solution contain the same solvent, the electrode active material precursor can be efficiently dispersed in the pore of the porous solid electrolyte in the step of immersing the porous solid electrolyte in the first sol solution.

The surfactant is not particularly limited, and may be a cationic surfactant such as ethanol or an anionic surfactant such as sodium dodecylsulfate.

Figure 4:
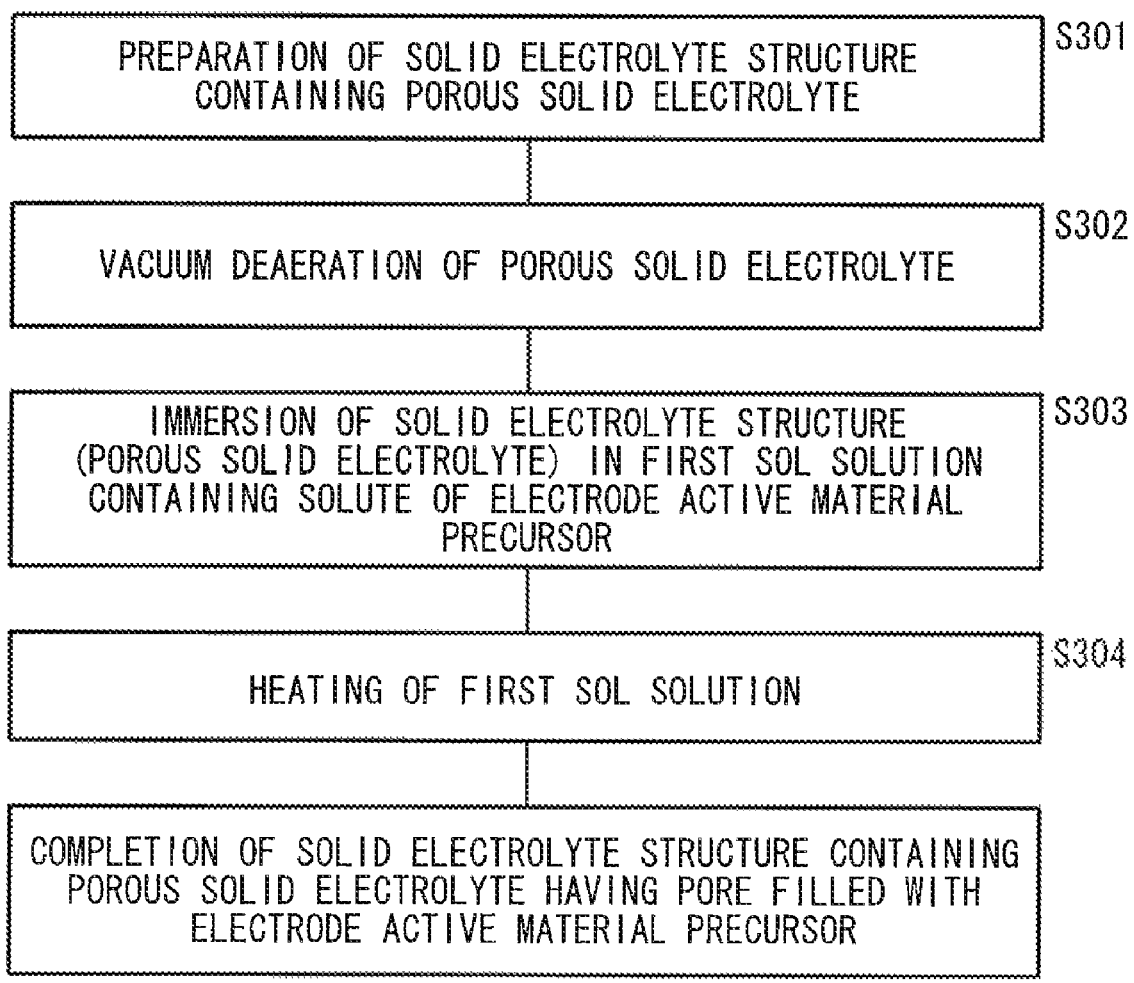
FIG. 4 is a process block diagram of a second modification example.

In an electrode active material filling method according to a second modification example, first, in the step S301 of FIG. 4, a solid electrolyte structure containing a porous solid electrolyte is prepared. In the step S302 of FIG. 4, air in the pore of the porous solid electrolyte is removed in vacuum, to carry out vacuum deaeration. Then, in the step S303, at least the porous solid electrolyte of the solid electrolyte structure is immersed in the first sol solution. By carrying out the vacuum aspiration in advance, the first sol solution can be easily introduced into the pore of the porous solid electrolyte even in a case where the first sol solution contains a solvent having a high surface tension such as water. Next, in the step S304 of FIG. 4, the first sol solution, in which the porous solid electrolyte is immersed, is heated in the same manner as the step S3 of FIG. 1. After the heating, the solid electrolyte structure is taken out, and the surface of the structure is wiped to remove the excess sol. Thus, the solid electrolyte structure, which contains the porous solid electrolyte having the pore filled with the electrode active material precursor at a high concentration, is obtained.

In a case where the first sol solution contains a solvent having a low surface tension such as an organic solvent, it is not necessary to carry out the pretreatment of the first modification example or the vacuum aspiration of the second modification example.

After the pore of the porous solid electrolyte is filled with the electrode active material precursor by the heating in the step S3 of FIG. 1 in the first embodiment, the step S204 of FIG. 3 in the first modification example, or the step S304 of FIG. 4 in the second modification example, the solid electrolyte structure, which contains the porous solid electrolyte having the pore filled with the electrode active material precursor, is subjected to a thermal treatment in the step S4 of FIG. 1, whereby the precursor in the pore is converted to the electrode active material. For example, the thermal treatment may be carried out at 600° C. for 2 hours under an inert atmosphere. At this stage, a composite electrode of the porous solid electrolyte and the electrode active material is obtained. Thus, in the solid electrolyte structure, a portion corresponding to the porous solid electrolyte forms the composite electrode.

In this embodiment, in a case where the porous solid electrolyte is formed on both surfaces of the dense solid electrolyte in the solid electrolyte structure, by the step S4 of FIG. 1, an all-solid-state cell, which has a positive composite electrode on one surface and has a negative composite electrode on the other surface, is obtained.

In a case where the porous solid electrolyte is formed on one surface of the dense solid electrolyte in the solid electrolyte structure, by the step S4 of FIG. 1, a positive or negative composite electrode is formed on the one surface of the dense solid electrolyte. Then, a counter electrode such as a metal film is formed on the other surface of the dense solid electrolyte to obtain an all-solid-state cell. The counter electrode is a positive electrode when the composite electrode is a negative electrode, and is a negative electrode when the composite electrode is a positive electrode.

As described above, in the electrode active material filling method of this embodiment, the porous solid electrolyte is immersed in the first sol solution containing at least the electrode active material precursor as a solute, and the first sol solution and the porous solid electrolyte immersed therein are heated, whereby the pore of the porous solid electrolyte can be efficiently filled with a large amount of the electrode active material by only one treatment.

An electrode active material filling method according to a second embodiment of the present invention will be described below with reference to FIG. 5.

Figure 5:
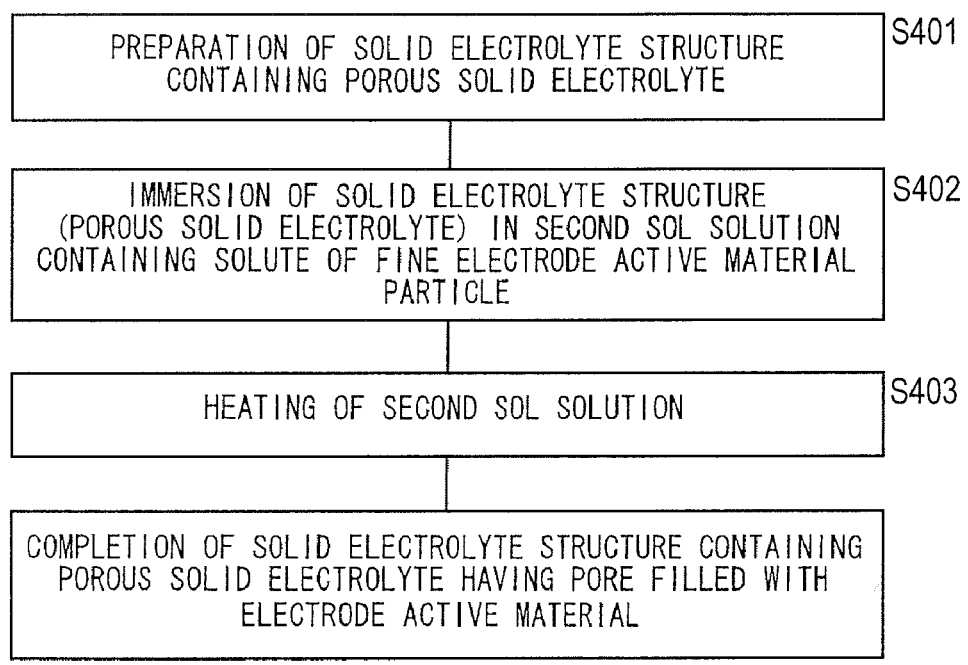
FIG. 5 is a process block diagram of an electrode active material filling method according to another embodiment of the present invention.

First, in the step S401 of FIG. 5, a solid electrolyte structure containing a porous solid electrolyte is prepared.

Then, in the step S402 of FIG. 5, at least the porous solid electrolyte of the solid electrolyte structure is immersed in a sol solution containing at least a fine particle of an electrode active material as a solute (hereinafter referred to as the second sol solution). Specifically, the second sol solution is placed in a vessel such as a beaker, and at least the porous solid electrolyte of the solid electrolyte structure is immersed therein. The particle diameter D1 of the fine electrode active material particle is preferably less than the pore diameter D2 of the porous solid electrolyte. It is more preferred that the relation of D1/D2<1/10 is satisfied.

In the the step S403 of FIG. 5, the second sol solution, in which the porous solid electrolyte is immersed, is heated. For example, the second sol solution is heated in air at 60° C. to 200° C. for 12 to 24 hours. By the heating treatment, a solvent in the second sol solution is volatilized to increase the concentration of the fine electrode active material particle. The fine electrode active material particle concentration is increased even in a pore of the porous solid electrolyte. Therefore, by completely drying the second sol solution, the pore of the porous solid electrolyte can be efficiently filled with a high concentration (a large amount) of the electrode active material by only one treatment (one cycle of the immersion and the heating).

When the heating in the step S403 is completed, the solid electrolyte structure is taken out, and the surface of the structure is wiped to remove the excess sol. Thus, the solid electrolyte structure, which contains the porous solid electrolyte having the pore filled with the electrode active material at a high concentration, is obtained. As a result, an all-solid-state cell having a composite electrode is obtained.

Also in the electrode active material filling method of the second embodiment, the pretreatment according to the first modification example or the vacuum aspiration according to the second modification example may be carried out.

As described above, in the electrode active material filling method of the second embodiment, at least the porous solid electrolyte of the solid electrolyte structure is immersed in the second sol solution containing at least the fine electrode active material particle as a solute, and the second sol solution and the porous solid electrolyte immersed therein are heated, whereby the pore of the porous solid electrolyte can be efficiently filled with a large amount of the electrode active material by only one treatment.

In an all-solid-state cell producing method according to this embodiment, by using the above electrode active material filling method, the pore of the porous solid electrolyte can be filled with a large amount of the electrode active material, whereby an all-solid-state cell can be efficiently produced with a low charge transfer resistance between the solid electrolyte and the electrode active material.

FIRST EXAMPLE

First Example will be described below. In First Example, Example 1 and Comparative Example 1 are compared in terms of the degree of filling pores of a porous solid electrolyte with an electrode active material.

EXAMPLE 1

(Preparation of Porous Solid Electrolyte)

Using a solid-phase synthesis method, powders of $Li_2CO_3$, $GeO_2$, $Al_2O_3$, and $NH_4H_2(PO_4)_3$ were mixed at the stoichiometric composition ratio of a solid electrolyte $Li_{1.5}Al_{0.5}Ge_{1.5}$ $(PO_4)_3$ (LAGP) and fired at 900° C. in the air, to obtain a crystal powder of the LAGP (hereinafter referred to as the LAGP crystal powder).

The obtained LAGP crystal powder was formed by press molding into a pressed powder pellet having a diameter of approximately 16 mm and a height (a thickness) of approximately 1 mm. The pressed powder pellet was fired at 840° C. in the air to obtain a fired LAGP solid electrolyte pellet.

Then, a paste for screen printing was prepared using the LAGP crystal powder. In this example, depending on desired pores to be formed in a porous layer, a binder of S-LEC B (trade name) available from Sekisui Chemical Co., Ltd., an organic solvent of CS-12 (trade name) available from Chisso Corporation, and a pore forming agent of theobromine were added to the LAGP crystal powder to prepare the screen printing paste. The screen printing paste was applied by screen printing to a surface of the fired solid electrolyte pellet. The solid electrolyte pellet, provided with the screen printing paste, was thermally treated at 800° C. in the air to obtain a porous solid electrolyte pellet.

(Preparation of Electrode Active Material Precursor Solution)

$V_2O_5$ and an aqueous $H_2O_2$ were mixed, and $LiOH.H_2O$, $NH_4H_2(PO_4)_3$, and citric acid were added thereto at the stoichiometric composition ratio of an electrode active material $Li_3V_2(PO_4)_3$ (LVP). The resultant solution was stirred at 60° C. for 10 hours to obtain an LVP precursor solution.

(Filling with Electrode Active Material Precursor)

The porous solid electrolyte pellet was immersed for 2 hours in an aqueous solution containing 0.02 mol/L of an anionic surfactant, such as an aqueous SDS solution (an aqueous sodium dodecylsulfate solution). Then, the porous solid electrolyte pellet was separated from the aqueous solution, and the surface of the pellet was mildly wiped. Then, the porous solid electrolyte pellet was immersed in 4 ml of the LVP precursor solution. The LVP precursor solution and the porous solid electrolyte pellet immersed therein (e.g. a beaker containing the solution) were heated on a hot plate at 150° C. to evaporate the solution, and placed in a drying device at 80° C. to completely dry the solvent in the solution. After the drying, the porous solid electrolyte pellet was taken out and subjected to a thermal treatment in an argon flow at 600° C. for 2 hours.

(SEM Observation)

Figure 6:
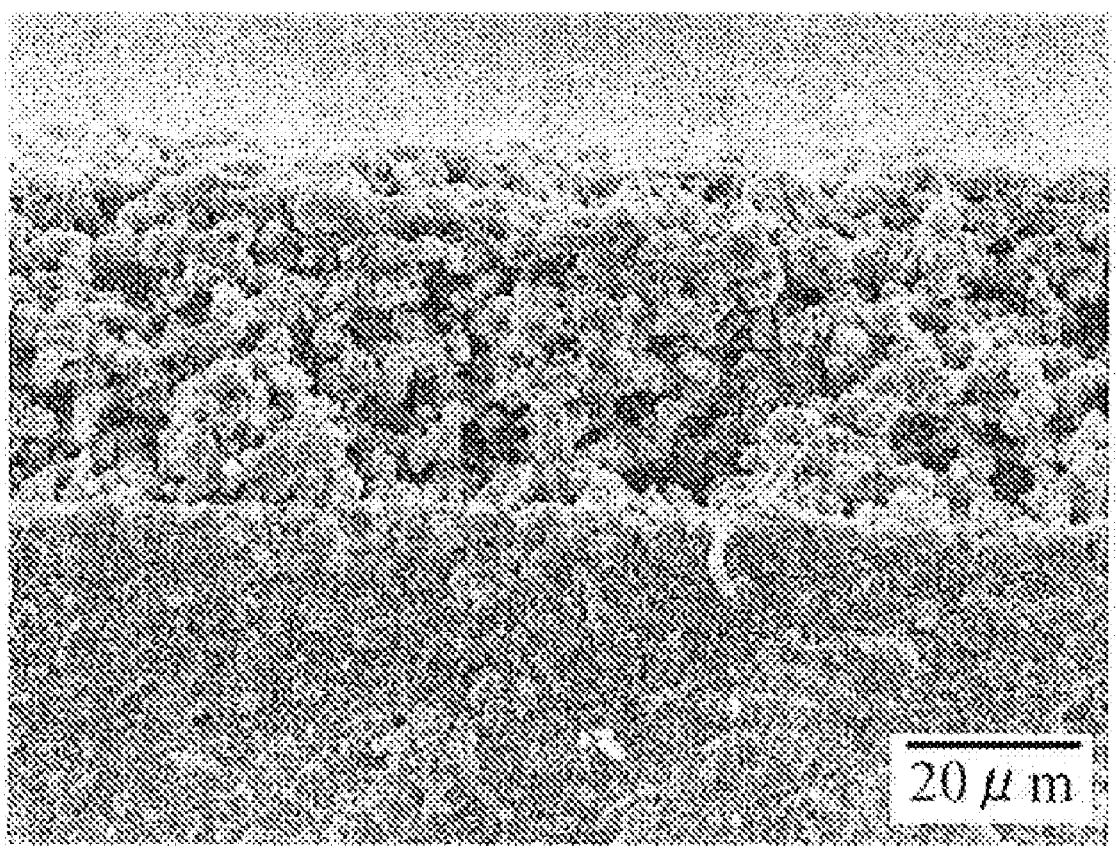
FIG. 6 is an SEM photograph of a porous solid electrolyte pellet before being filled with an LVP precursor.
Figure 7:
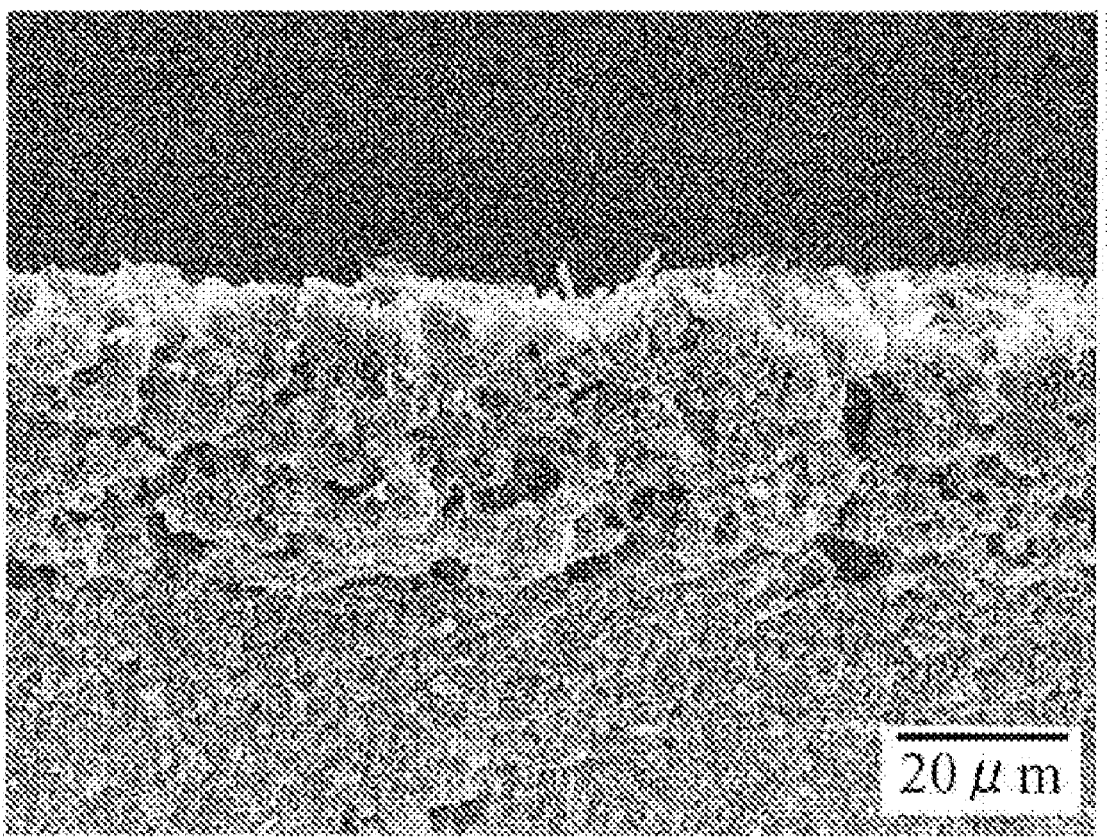
FIG. 7 is an SEM photograph of the porous solid electrolyte pellet filled with the LVP precursor according to Example 1.

FIG. 6 is an SEM photograph of the porous solid electrolyte pellet before the filling with the LVP precursor, and FIG. 7 is an SEM photograph of the porous solid electrolyte pellet after the filling with the LVP precursor of Example 1. In comparison with the unfilled porous solid electrolyte shown in FIG. 6, the pores of the porous solid electrolyte were filled with the LVP precursor in FIG. 7.

COMPARATIVE EXAMPLE 1

(Preparation of Porous Solid Electrolyte)

A porous solid electrolyte pellet was prepared in the same manner as Example 1.

(Preparation of Electrode Active Material Precursor Solution)

An electrode active material precursor solution was prepared in the same manner as Example 1.

(Filling with Electrode Active Material Precursor)

5 μl of the LVP precursor solution was dropped onto a surface of the porous layer of the porous solid electrolyte pellet. The porous solid electrolyte pellet was rapidly put in a desiccator before the solution was dried, and the air in the desiccator was vacuum-aspirated for 1 minute. Then, the porous solid electrolyte pellet was dried at 80° C.

(SEM Observation)

Figure 8:
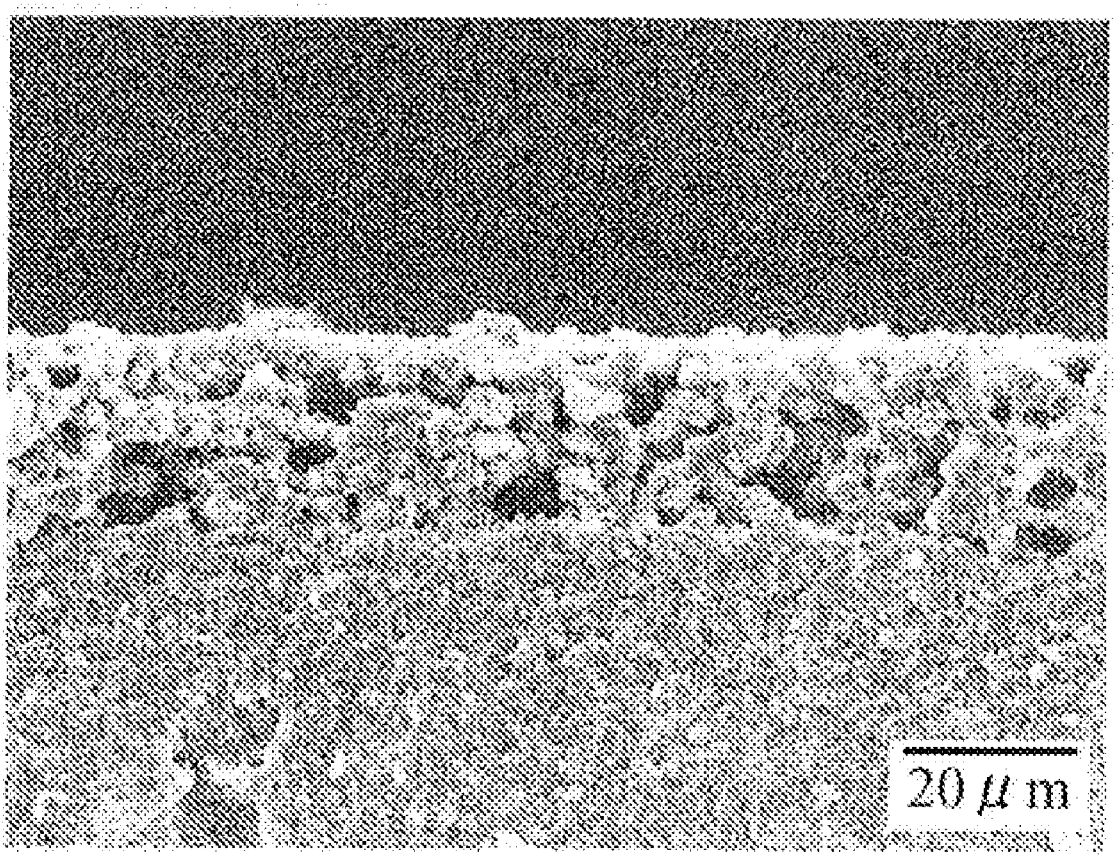
FIG. 8 is an SEM photograph of the porous solid electrolyte pellet filled with the LVP precursor according to Comparative Example 1.

FIG. 8 is an SEM photograph of the porous solid electrolyte pellet after the filling with the LVP precursor of Comparative Example 1. In comparison with FIG. 7 of Example 1, the pores of the porous solid electrolyte were hardly filled with the LVP precursor in FIG. 8.

SECOND EXAMPLE

Second Example will be described below. In Second Example, Example 2 and Comparative Example 2 are compared in terms of the degree of filling pores of a porous solid electrolyte with an electrode active material.

EXAMPLE 2

(Preparation of Porous Solid Electrolyte)

Monodisperse spherical polystyrene particles having diameter of 3 μm were dispersed in ethanol to obtain a suspension. The suspension was filtrated to deposit the polystyrene particles. The deposition was dried and thermally treated at 100° C. for 15 minutes to fuse the polystyrene particles.

The deposition of the polystyrene particles was filled with a sol containing a solid electrolyte of $Li_{0.35}La_{0.55}TiO_3$. The sol was prepared by mixing 2-propanol, acetic acid, titanium tetraisopropoxide, water, lithium acetate, and lanthanum acetate at the stoichiometric composition ratio.

The $Li_{0.35}La_{0.55}TiO_3$ sol was converted to a gel. The resulting composite of the polystyrene particles and the $Li_{0.35}La_{0.55}TiO_3$ gel was thermally treated in the air at 450° C. for 1 hour to remove the polystyrene particles, and was further thermally treated at 1000° C. for 1 hour to obtain a porous solid electrolyte pellet ($Li_{0.35}La_{0.55}TiO_3$).

(Preparation of Electrode Active Material Precursor Solution)

Manganese acetate tetrahydrate and lithium acetate were dissolved in water at a mole ratio of 2:1.2. Meanwhile, polyvinylpyrrolidone and acetic acid were dissolved in 2-propanol. The obtained two solutions were mixed to obtain an $LiMn_2O_4$ precursor solution.

(Filling with Electrode Active Material Precursor)

The porous solid electrolyte pellet was immersed for 2 hours in an aqueous solution containing 0.02 mol/L of an anionic surfactant, such as an aqueous SDS solution (an aqueous sodium dodecylsulfate solution). Then, the porous solid electrolyte pellet was separated from the aqueous solution, and the surface of the pellet was mildly wiped. Then, the porous solid electrolyte pellet was immersed in 20 ml of the $LiMn_2O_4$ precursor solution. The $LiMn_2O_4$ precursor solution and the porous solid electrolyte pellet immersed therein (e.g. a beaker containing the solution) were heated on a hot plate at 100° C. to evaporate the solution, and placed in a drying device at 80° C. to completely dry the solvent in the solution. After the drying, the porous solid electrolyte pellet was taken out and subjected to a thermal treatment in the air at 700° C. for 2 hours.

(SEM Observation)

Figure 9:
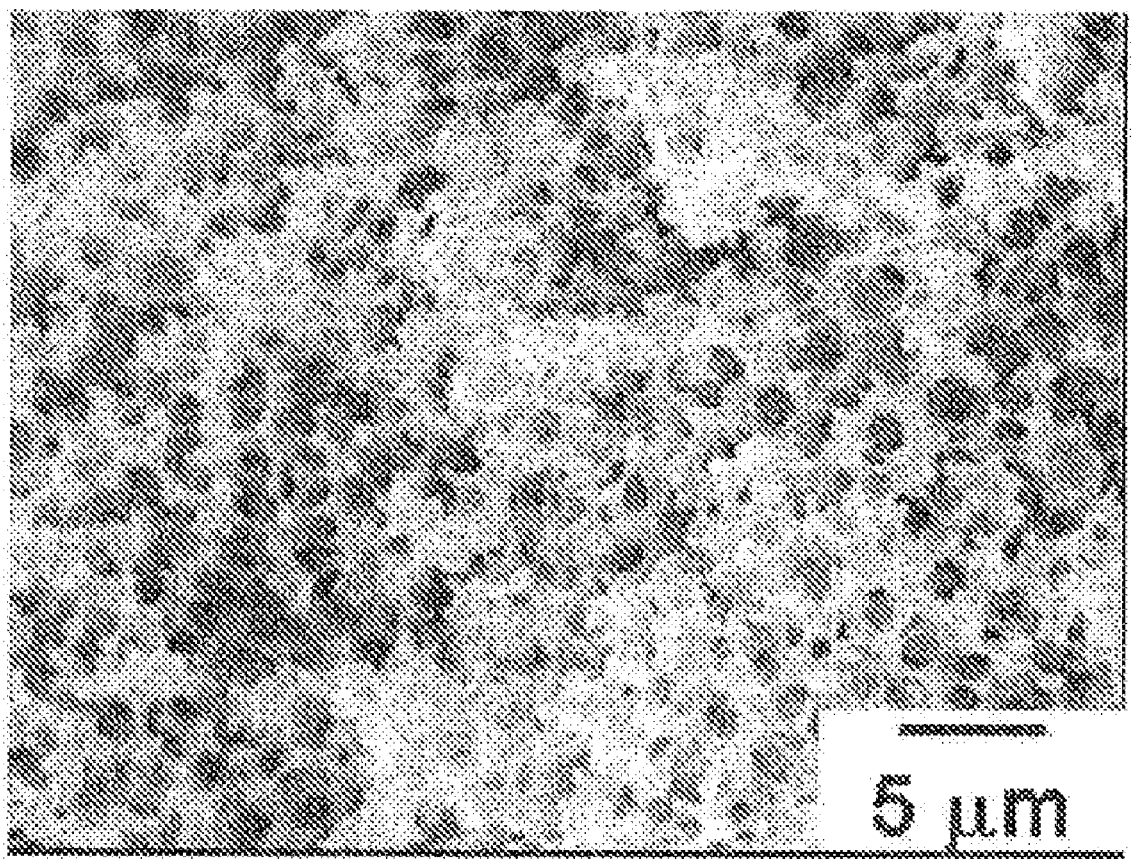
FIG. 9 is an SEM photograph of a porous solid electrolyte pellet before being filled with an $LiMn_2O_4$ precursor.
Figure 10:
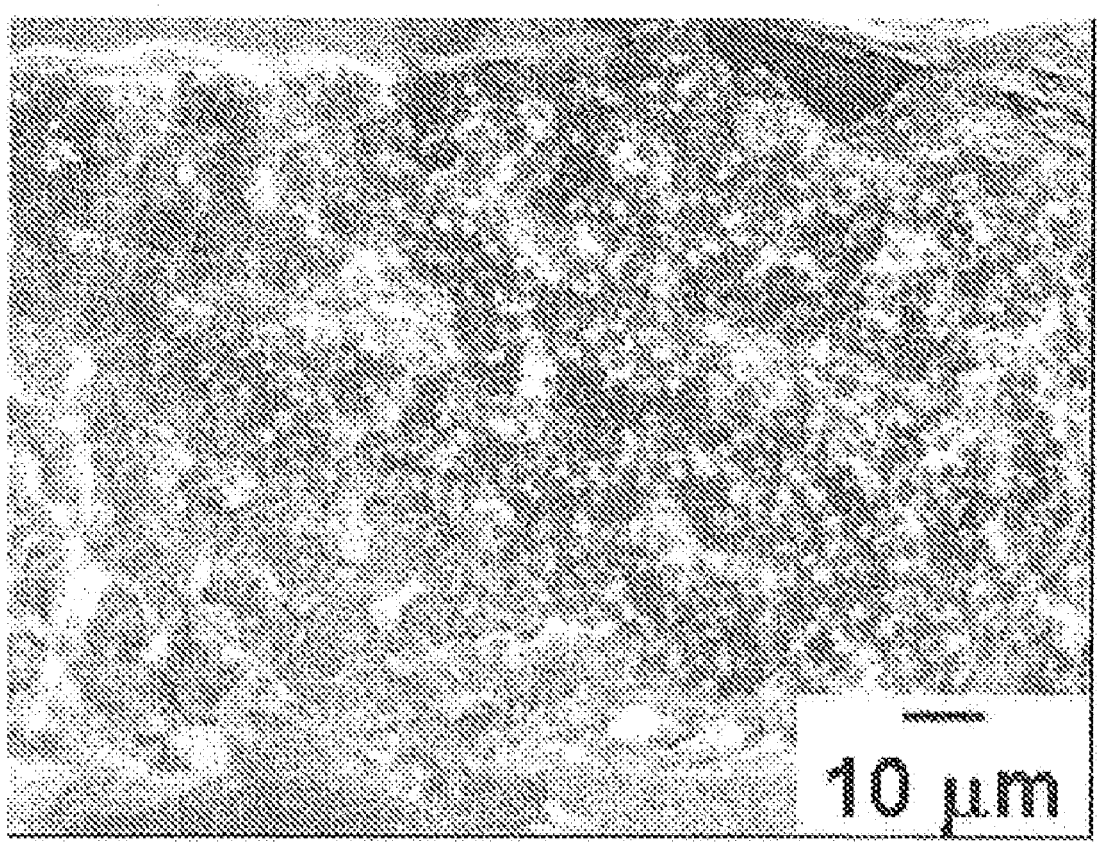
FIG. 10 is an SEM photograph of the porous solid electrolyte pellet filled with the $LiMn_2O_4$ precursor according to Example 2.

FIG. 9 is an SEM photograph of the porous solid electrolyte pellet before the filling with the $LiMn_2O_4$ precursor, and FIG. 10 is an SEM photograph of the porous solid electrolyte pellet after the filling with the $LiMn_2O_4$ precursor of Example 2. In comparison with the unfilled porous solid electrolyte shown in FIG. 9, the pores of the porous solid electrolyte were filled with the $LiMn_2O_4$ precursor in FIG. 10.

COMPARATIVE EXAMPLE 2

(Preparation of Porous Solid Electrolyte)

A porous solid electrolyte pellet was prepared in the same manner as Example 2.

(Preparation of Electrode Active Material Precursor Solution)

An electrode active material precursor solution was prepared in the same manner as Example 2.

(Filling with Electrode Active Material Precursor)

5 μl of the $LiMn_2O_4$ precursor solution was dropped onto the porous solid electrolyte pellet. The porous solid electrolyte pellet was rapidly put in a desiccator before the solution was dried, and the air in the desiccator was vacuum-aspirated for 10 minutes. Then, the porous solid electrolyte pellet was dried at 80° C.

(SEM Observation)

Figure 11:
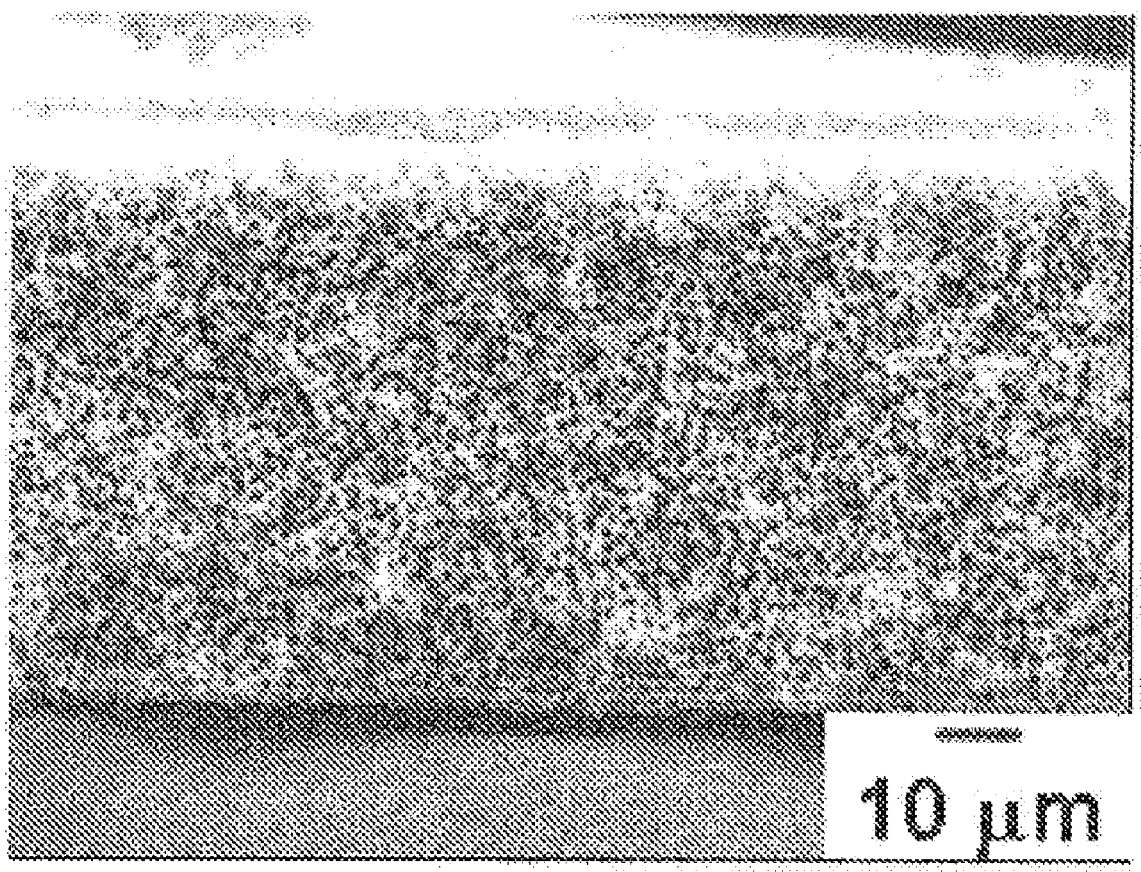
FIG. 11 is an SEM photograph of the porous solid electrolyte pellet filled with the $LiMn_2O_4$ precursor according to Comparative Example 2.

FIG. 11 is an SEM photograph of the porous solid electrolyte after the filling with the $LiMn_2O_4$ precursor of Comparative Example 2. In comparison with FIG. 10 of Example 2, the pores of the porous solid electrolyte were hardly filled with the $LiMn_2O_4$ precursor in FIG. 11.

THIRD EXAMPLE

Third Example will be described below. In Third Example, Example 3 and Comparative Example 3 are compared in terms of the degree of filling pores of a porous solid electrolyte with an electrode active material.

(Preparation of Porous Solid Electrolyte)

An aluminum-containing ceramic material, which had a garnet-type or garnet-like-type crystal structure containing lithium, lanthanum, zirconium, and oxygen, and had a particle diameter of approximately 1 μm, was used as fine solid electrolyte particles (hereinafter referred to as the fine LLZ particles for convenience). A solution containing 30 mg of the fine LLZ particles, 0.2 ml of a 10% solution of a polystyrene having a particle diameter of approximately 3 μm, and 30 ml of EtOH was prepared, and mixed under ultrasonic irradiation. The solution was introduced to a filtration unit (equipped with a filter for filtrating the solution), and slowly suction-filtered at approximately $1.0 \times 10^{-1}$ kPa, whereby a porous solid electrolyte precursor was deposited on the filter.

The porous solid electrolyte precursor was dried on the filter at the room temperature, and then separated from the filter, pressurized at 60 MPa for 5 minutes, next heated to 1125° C. in one hour, and maintained at 1125° C. for 6 hours, to obtain a porous solid electrolyte pellet (LLZ).

(Preparation of Electrode Active Material Precursor Solution)

Cobalt acetate tetrahydrate, lithium acetate, and water were mixed at a mole ratio of 1:1.1:70. Meanwhile, polyvinylpyrrolidone, acetic acid, and 2-propanol were mixed at a mole ratio of 1:20:20. The obtained two solutions were mixed to obtain an $LiCoO_2$ precursor solution.

(Filling with Electrode Active Material Precursor)

The porous solid electrolyte pellet was immersed under a reduced pressure for 1 hour in an aqueous solution containing $2 \times 10^{-2}$ mol/L of an anionic surfactant, such as an aqueous SDS solution (an aqueous sodium dodecylsulfate solution). The porous solid electrolyte pellet was separated from the aqueous solution, and the surface of the pellet was mildly wiped. Then, the porous solid electrolyte pellet was immersed in 20 ml of the $LiCoO_2$ precursor solution. The $LiCoO_2$ precursor solution and the porous solid electrolyte pellet immersed therein (e.g. a beaker containing the solution) were heated on a hot plate at 70° C. to evaporate the solution, and placed in a drying device at 85° C. to completely dry the solvent in the solution. After the drying, the porous solid electrolyte pellet was taken out and thermally treated in the air (subjected to a calcination treatment at 450° C. for 1 hour and a final firing treatment at 800° C. for 5 hours)

(SEM Observation)

Figure 12:
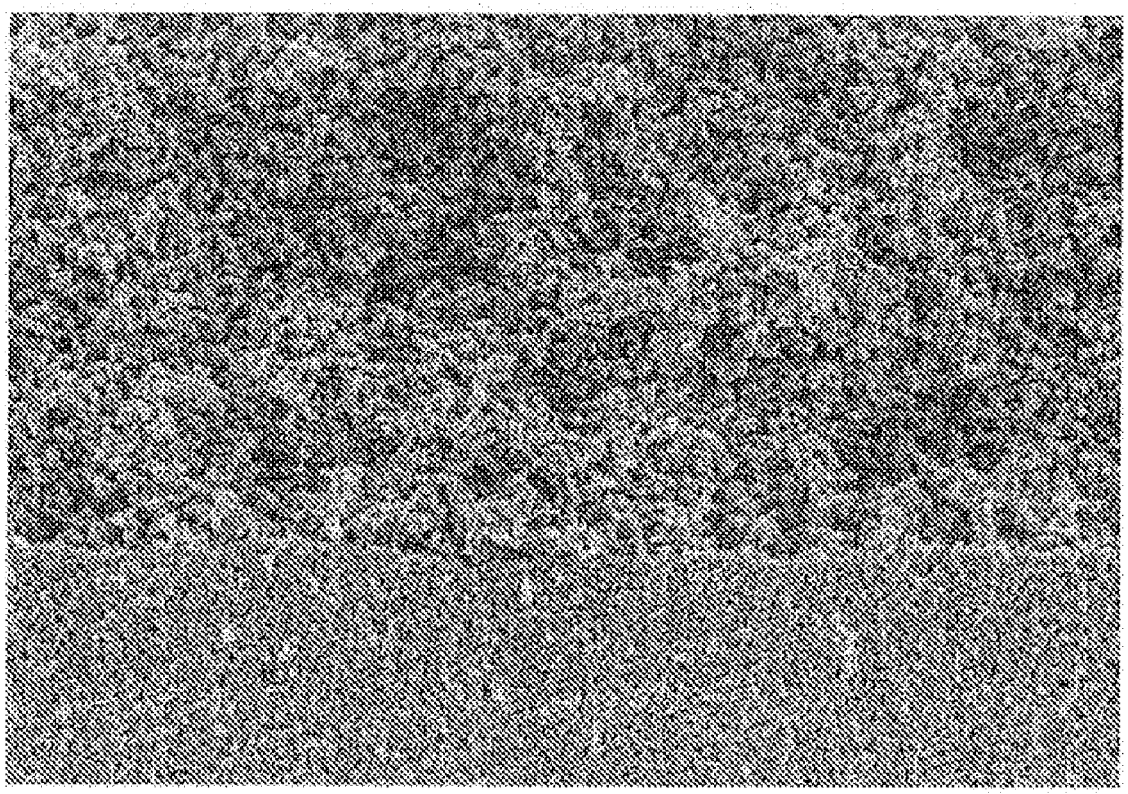
FIG. 12 is an SEM photograph of a porous solid electrolyte pellet before being filled with an $LiCoO_2$ precursor.
Figure 13:
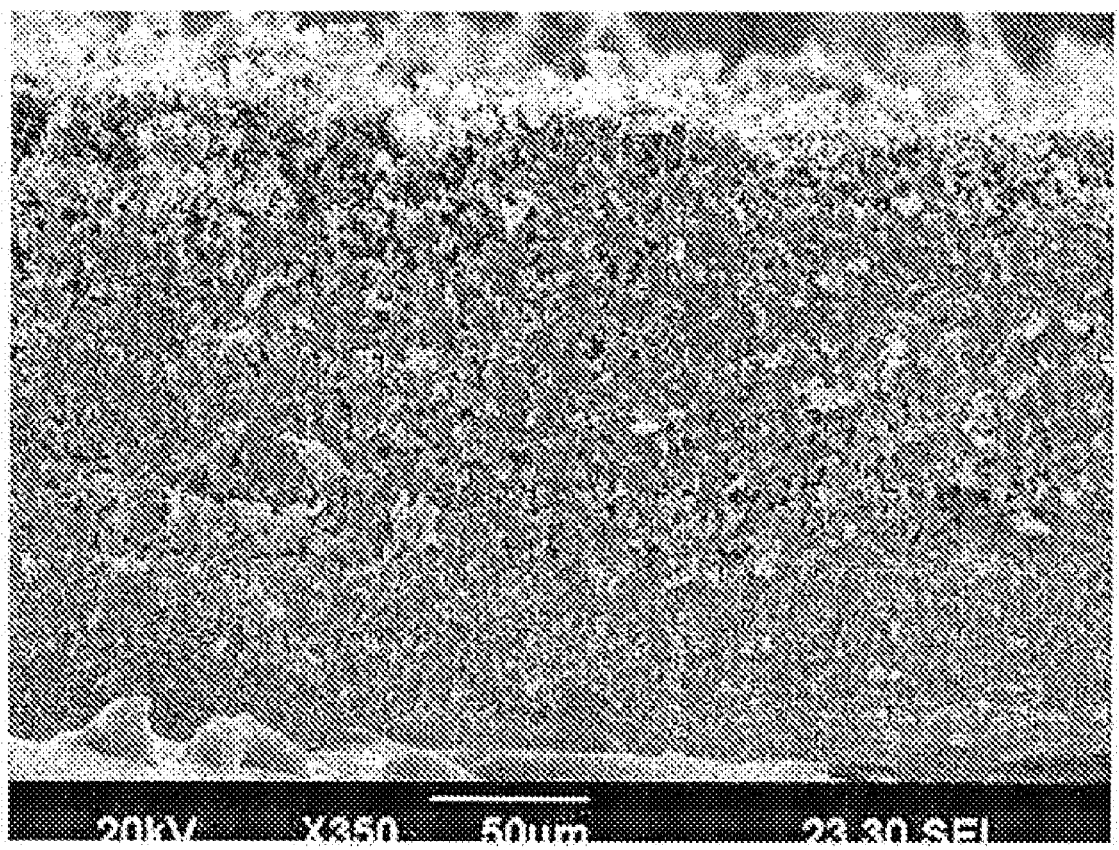
FIG. 13 is an SEM photograph of the porous solid electrolyte pellet filled with the $LiCoO_2$ precursor according to Example 3.

FIG. 12 is an SEM photograph of the porous solid electrolyte pellet before the filling with the $LiCoO_2$ precursor, and FIG. 13 is an SEM photograph of the porous solid electrolyte pellet after the filling with the $LiCoO_2$ precursor of Example 3. In comparison with the unfilled porous solid electrolyte shown in FIG. 12, the pores of the porous solid electrolyte were filled with the $LiCoO_2$ precursor in FIG. 13.

COMPARATIVE EXAMPLE 3

(Preparation of Porous Solid Electrolyte)

A porous solid electrolyte pellet was prepared in the same manner as Example 3.

(Preparation of Electrode Active Material Precursor Solution)

An electrode active material precursor solution was prepared in the same manner as Example 3.

(Filling with Electrode Active Material Precursor)

The porous solid electrolyte pellet was immersed in the $LiCoO_2$ precursor solution. Then, the porous solid electrolyte pellet was dried at 80° C.

(SEM Observation)

Figure 14:
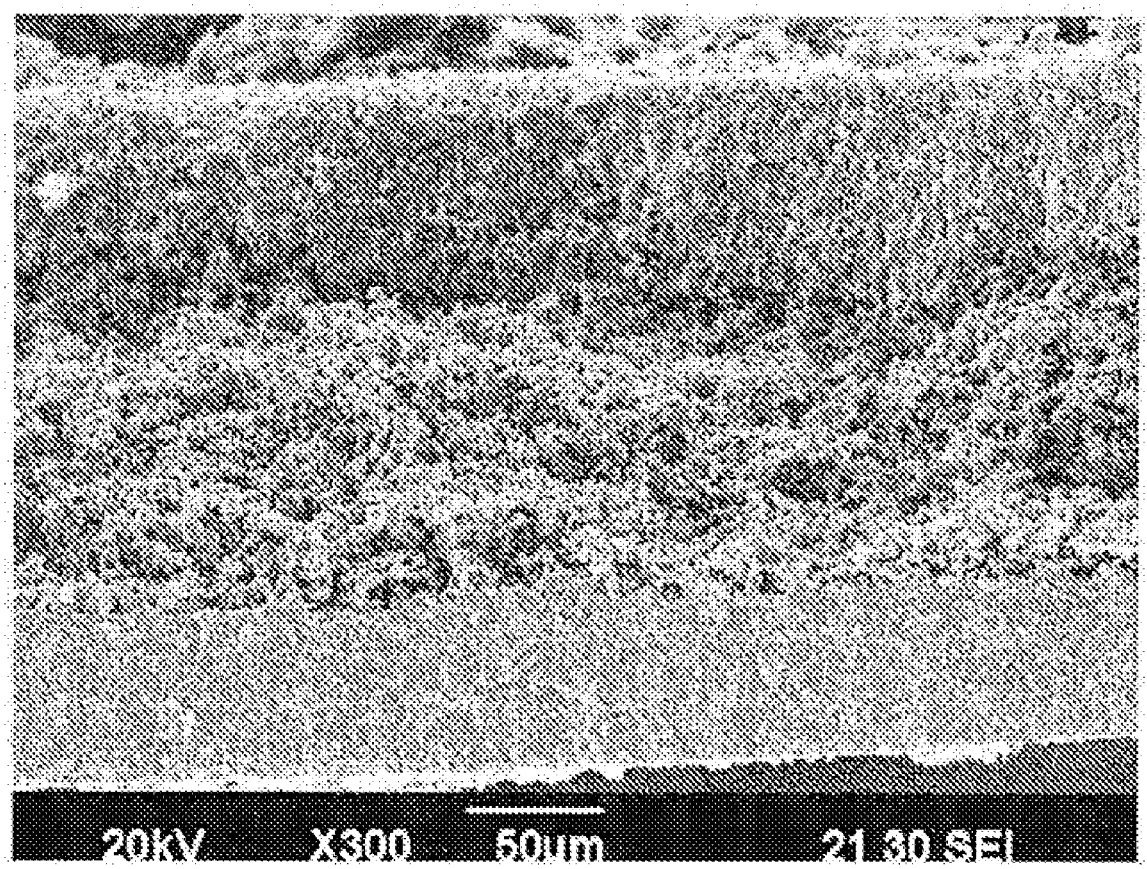
FIG. 14 is an SEM photograph of the porous solid electrolyte pellet filled with the $LiCoO_2$ precursor according to Comparative Example 3.

FIG. 14 is an SEM photograph of the porous solid electrolyte after the filling with the $LiCoO_2$ precursor of Comparative Example 3. In comparison with FIG. 13 of Example 3, although the pores on the surface of the porous solid electrolyte were filled with the $LiCoO_2$ precursor, the pores at the inner portion of the porous solid electrolyte were hardly filled with the $LiCoO_2$ precursor in FIG. 14.

It is to be understood that the electrode active material filling method and the all-solid-state cell producing method of the present invention are not limited to the above embodiment, and various changes and modifications may be made therein without departing from the scope of the invention.

What is claimed is:

1. A method for filling a pore of a porous solid electrolyte with an electrode active material, comprising:
   an immersion step of immersing the porous solid electrolyte in a precursor solution containing at least a precursor of the electrode active material as a solute; and
   a heating step of heating the precursor solution in which the porous solid electrolyte is immersed.

2. A method according to claim 1, further comprising a thermal treatment step of, after the heating step, subjecting the precursor of the electrode active material filling the pore of the porous solid electrolyte to a thermal treatment, thereby converting the precursor of the electrode active material to the electrode active material.

3. A method according to claim 1, further comprising a pretreatment step of, before the immersion step, immersing the porous solid electrolyte in a pretreatment solution containing at least a surfactant as a solute.

4. A method according to claim 3, wherein the pretreatment solution and the precursor solution contain the same solvent.

5. A method according to claim 1, wherein in the immersion step, after being vacuum-deaerated, the porous solid electrolyte is immersed in the precursor solution.

6. A method according to claim 1, wherein the porous solid electrolyte comprises an oxide or a phosphate compound.

7. A method according to claim 1, wherein the porous solid electrolyte comprises an LLT ($Li_{3x}La_{2/3-x}TiO_3$, $0 \leq x \leq 2/3$), an LAMP ($Li_{1+x}Al_xM_{2-x}(PO_4)_3$, $0 \leq x \leq 1$, M is a tetravalent transition metal such as Ge, Ti or Zr), or an aluminum (Al)-containing ceramic material having a garnet-type or garnet-like-type crystal structure containing lithium (Li), lanthanum (La), zirconium (Zr), and oxygen (O).

8. A method according to claim 1, wherein the electrode active material comprises an oxide or a phosphate compound.

9. A method according to claim 1, wherein the electrode active material comprises a lithium-manganese composite oxide, a lithium-cobalt composite oxide, or an LVP ($Li_mV_2(PO_4)_3$, $1 \leqq m \leqq 5$).

10. A method for filling a pore of a porous solid electrolyte with an electrode active material, comprising
- an immersion step of immersing the porous solid electrolyte in an electrode active material solution containing at least a fine particle of the electrode active material as a solute, and
- a heating step of heating the electrode active material solution in which the porous solid electrolyte is immersed.

11. A method for producing an all-solid-state cell, comprising at least an electrode active material filling process of filling a pore of a porous solid electrolyte with an electrode active material, wherein
the electrode active material filling process comprises:
- an immersion step of immersing the porous solid electrolyte in a precursor solution containing at least a precursor of the electrode active material as a solute; and
- a heating step of heating the precursor solution in which the porous solid electrolyte is immersed.

12. A method according to claim 11, further comprising a thermal treatment step of, after the heating step, subjecting the precursor of the electrode active material filling the pore of the porous solid electrolyte to a thermal treatment, thereby converting the precursor of the electrode active material to the electrode active material.

13. A method for producing an all-solid-state cell, comprising at least an electrode active material filling process of filling a pore of a porous solid electrolyte with an electrode active material, wherein
the electrode active material filling process comprises:
- an immersion step of immersing the porous solid electrolyte in an electrode active material solution containing at least a fine particle of the electrode active material as a solute; and
- a heating step of heating the electrode active material solution in which the porous solid electrolyte is immersed.

* * * * *